Sept. 27, 1960     S. C. ARGYLE     2,953,962
IMAGE NUTATOR
Filed Dec. 16, 1957
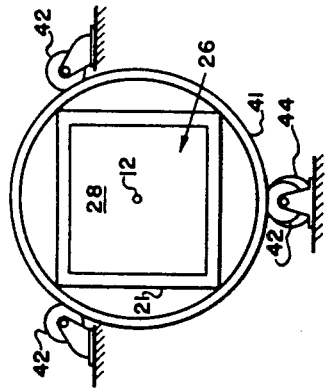
FIG-2-
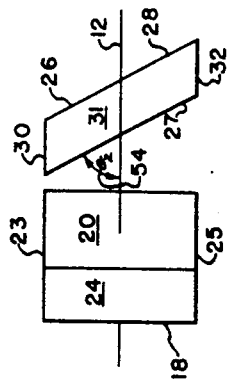
FIG-4-
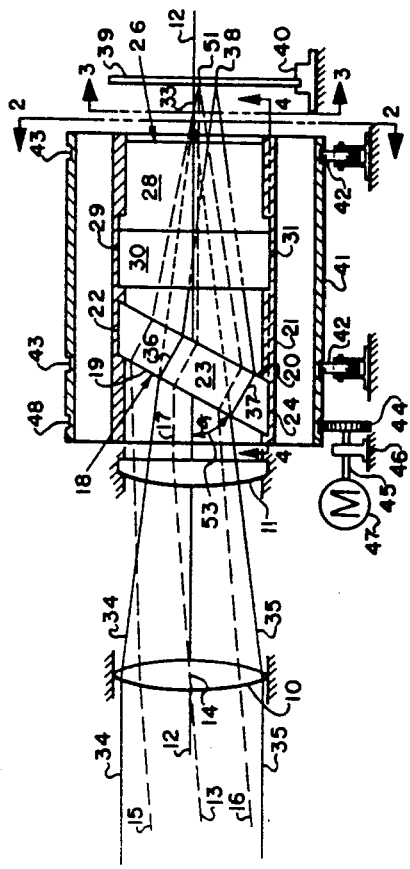
FIG-1-
FIG-3-
INVENTOR.
SIDNEY C. ARGYLE
BY
ATTORNEY

United States Patent Office 2,953,962
Patented Sept. 27, 1960

2,953,962

IMAGE NUTATOR

Sidney C. Argyle, Glendora, Calif., assignor to Aerojet-General Corporation, Azusa, Calif., a corporation of Ohio Filed Dec. 16, 1957, Ser. No. 703,219

9 Claims. (Cl. 88—1)

This invention relates to optical systems and more particularly to image nutator optical systems in which each point in the image plane is periodically translated through a series of positions.

The object of this invention is to provide an optical device which can shift each point in the image plane without appreciable aberrations in such a manner that an approximately circular locus path is clearly described by each point image about the geometric mean position for the series of positions of each point image.

In devices designed to cause point images to move through a series of positions periodically, the image formed will not ordinarily appear as a point for the image positions due to aberrations introduced by the means for causing image displacement by refraction of light rays. Moving point images of good quality are useful for example in sighting devices such as gunsights. The locus of the moving point image serves as a convenient reference so that the mean image position which is representative of the object's position may be easily and accurately determined.

This invention provides an optical system having moving light-transmitting elements in the optical path which shift rays forming each point image through a series of positions by refraction. Aberration is compensated for in the present invention by providing an image shifting device comprising two uniquely positioned refracting elements. The two refracting elements are disposed and arranged in a suitable manner with respect to the optical axis of the system and in rotatable correspondence with one another so that aberration introduced by each one of the refracting elements is compensated for by the other one of the refracting elements.

This invention also utilizes a collimating lens which has the effect of making each principal ray which enters the optical system through the optical center of the system's aperture, parallel to the optical axis of the system.

A feature of this invention resides in a pair of refracting means positioned in the optical path of the optical system, having light transmitting surfaces which have fixed and equal angles with respect to the optical axis of the optical system, but which pair of refracting means are rotatable about the optical axis.

A second feature of the invention resides in a collimating lens in the optical path which is designed to make principal rays entering the system parallel to the system's optical axis so that non-axial object points may be affected the same as axial object points.

These and other features of the invention will be fully understood from the following detailed description and the accompanying drawings, of which:

Fig. 1 is a side view, partly in cutaway cross-section, of an optical system according to the invention;

Fig. 2 is a cross-section view taken at line 2—2 of Fig 1;

Fig. 3 is a cross-section view taken at line 3—3 in Fig. 1; and

Fig. 4 is a cross section view taken at line 4—4 in Fig. 1.

In Fig. 1 there is shown an optical system having a convergent objective lens 10. The lens 10 is located at the object end of the optical system, which is the left end of Fig. 1. A collimating lens 11 located farther from the object end is also provided. The lenses 10 and 11 are each located on the optical axis 12 of the optical system. These two lenses 10 and 11 refract entering light rays, for example the rays represented by the lines 34 and 35 are actually refracted by the lens 11 and also the rays represented by the lines 15 and 16 are actually refracted by the lens 10. For purposes of ease of illustration, so as to more particularly emphasize the effects upon the rays due to other components of the optical system, these refractions by the lenses 10 and 11 are not shown in detail in Fig. 1. It is to be understood that in actual practice the lenses 10 and 11 are generally designed as a unit and that in such unit design the optical effect of the plates 18 and 26 would also be considered. Such unit design is commonand well known and need not be further discussed herein. The purpose of the lens 11 is to make each principal ray, one of which is represented by a line 13, in Fig. 1 through the optical center 14 of the objective lens 10, parallel to the optical axis 12. Non-axial objects thus have their principal rays made parallel to the optical axis 12 after their rays pass through the collimating lens 11. Lines 15 and 16 represent the plurality of rays from a non-axial point object, which are all rays other than the principal ray 13 of that same non-axial point object. A line 17 represents a portion of the principal ray 13 made parallel to the optical axis 12 at a location to the right of the collimating lens 11.

A transparent plate 18 is located on the optical axis 12, adjacent to the collimating lens 11 on the other side thereof from the object end of the system. The transparent plate 18, which may be made of glass, plastic or the like, has two major light-transmitting surfaces 19 and 20 which are parallel to one another and which are set at an angle $\theta$ to the optical axis 12, numbered 53 in Fig. 1. The angle $\theta$ is fixed with respect to the optical axis 12 by means of the plate 18 being mounted in a frame 21. The major surfaces 19 and 20 of the plate 18 are connected by four minor surfaces of which three, identified by the numbers 22, 23 and 24, are shown in Fig. 1. A fourth minor surface 25 is shown in Fig. 4. The four minor surfaces 22, 23, 24 and 25 are in contact with the frame 21 which holds the plate 18.

A second transparent plate 26 is also located on the optical axis 12 adjacent to and spaced from surface 20 of the plate 18. The plate 26, which may be made of the same material as the plate 18, has two major surfaces 27 and 28, best shown in Fig. 4. The surfaces 27 and 28 are parallel to one another and are set at an angle $\theta_2$, represented by the number 54, with respect to the optical axis 12 which is equal in magnitude to the angle $\theta_1$ of the plate 18, but the two plates 18 and 26 are 90 degrees from one another in rotation about the axis 12. The plate 26 is also mounted in the frame 21. The major surfaces 27 and 28 of plate 26 are connected by four minor surfaces of which three, identified by the numbers 29, 30 and 31, are shown in Fig. 1. A fourth minor surface 32 is shown in Fig. 4. The four minor surfaces 29, 30, 31 and 32 are in contact with the frame 21 which holds the plate 26. The plate 18 and the plate 26 are of equal thickness measured between their respective pairs of major surfaces 19 and 20, and 27 and 28, respectively.

The convergent objective lens 10 and the collimating lens 11 in the absence of plates 18 and 26, would form a point image at 33 of an axial point object located on the optical axis 12 and to the left of the objective lens 10. The point image at 33 would be formed on the optical axis 12. The effect of the plates 18 and 26 is to shift the image axially and to displace it laterally by refracting the light rays, due to the inclined angles relative to the optical axis 12 at which their major surfaces 19, 20 and 27 and 28, respectively, are disposed. It should be understood that the equal angles of inclination chosen are ones that are suitable, dependent on the amount of refraction desired and the type of material and the thickness of the plates, 18 and 26.

The bundle of rays represented by the lines 34 and 35, from a point object located on the optical axis 12, has a principal ray on the said optical axis. These rays in this bundle from an axial point object, represented by exemplary rays 34 and 35 are converged by the objective lens 10 and the collimating lens 11, and the principal ray remains parallel to the optical axis. The plate 18 refracts the rays 34 and 35 as shown by the portions of these rays 36 and 37 through the tilted plate 18. The plate 26 refracts the rays 34 and 35 received from the surface 20 of the plate 18. The rays 34 and 35 emerge from the plate 26 through the surface 28 and converge to form a point image at 38 on a screen 39. The point image at 38 is laterally displaced from the point image at 33, relative to the optical axis 12. The point image at 38 is also focussed at a position to the right of the point image at 33 because the plates 18 and 26 are composed of a material of a higher refractive index than air and thus produces a refraction. The screen 39 is located at the focal plane where the point image is formed at 38. A base 40 is provided to hold the screen 39 in the focal plane of the optical system.

Each light ray of a convergent beam, or bundle of rays, whether for an axial or non-axial object, is refracted by the plates 18 and 26 and emerges displaced but parallel to its original direction. The rays of each beam intersect on the screen 39, at the system's focal plane, displaced laterally due to refraction. The amount of each displacement depends upon the refractive index, inclination angle of the two plates light receiving surfaces with respect to the system's optical axis and thickness of the plates 18 and 26.

The frame 21 with the plate 18 mounted at the angle $\theta$, identified by the number 53 in Fig. 1, and with the plate 26 mounted at the angle $\theta_2$, identified by the number 54 in Fig. 4, is arranged so that the frame 21 is disposed in any suitable shaped arrangement, such as a box, around the optical axis 12. Angle $\theta_1$ equals angle $\theta_2$. The major surfaces of the framed plates 18 and 26 are inclined at equal angles from respective reference planes in space which are substantially parallel to one another and perpendicular with respect to the optical axis 12. It will be understood that these reference planes are imaginery planes and are not physically present in the structure. In the particular embodiment shown in Fig. 1, the transparent plates 18 and 26 are disposed along the optical axis and each of these plates is positioned normal to a respective plane which contains the optical axis, these respective planes being perpendicular to each other. It will be recognized that these said respective planes are likewise imaginery and no part of the physical structure and they are taken as the particular planes in which the optical axis lies. In Fig. 1, plate 26 is disposed along the optical axis and angularly displaced 90 degrees about an axis perpendicular to its plane major surfaces, from the similar position of the plate 18 if the two plates are viewed from the field lens 10 and considered as rotatable counter-clockwise at the optical axis 12 when so viewed.

The barrel 41, which is concentric around the optical axis 12, may be rotated about the optical axis upon rollers 42 shown in Figs. 1 and 2. The rollers 42 travel in roller groves 43 provided on the barrel 41. A gear 44 is mounted on an axle 45 which passes through a journal 46 to a motor 47. The gear 44 is in contact with a groove 48 on the barrel 41, shown in Fig. 1 which is provided with gear teeth.

Fig. 3 shows an image locus 49 represented by a circular line concentric around the optical axis 12 on the screen 39. The locus 49 is the path followed by an axial object's point image formed at the position 38. An image locus 50 represented by a substantially circular line represents the path followed by a particular chosen non-axial object's point image formed at the screen 39. Non-axial point objects form substantially circular locus paths but their loci are not concentric about the optical axis 12. Such loci are each substantially concentric about their geometric mean position which mean position is representative of the object's position in the field.

The optical elements of this device may be of any material transparent to the wave lengths used. It is to be understood that for different applications various sizes of elements would be used and that any dimensions of parts which fit into the geometry of the particular application of use would be suitable.

The angle $\theta$ may be any suitable angle, usually smaller than 45 degrees. The focal length of the lens 11 is equal to its spacing from the exit pupil of the lens 10. Each of the plates 18 and 26, for example, may be one-half inch in thickness and might be circular with a one inch diameter (instead of square as shown). The angle $\theta$, for example, may be 15 degrees as a suitable angle of tilt of the plates 18 and 26.

The optical system is operated in the following manner. The motor 47 rotates the barrel 41 and the tilted plates 18 and 26 about the optical axis 12. A point object on the axis 12, if there is such an object in the field, sends rays represented by the lines 34 and 35 through objective lens 10 and the collimating lens 11 each of which converge the rays. The principal ray from an axial object point remains parallel to the axis 12 of the system after it emerges from lens 11. The tilted plate 18 and the tilted plate 26 each refract the convergent rays of the light beam so that the said rays are brought to focus in a point image at 38 on the screen 39, displaced from the optical axis 12 as shown in Fig. 1. The rotation of the barrel 41, the plate 18 and the plate 26 about the optical axis 12 causes the image point formed at 38 to follow the circular locus path 49 on the screen 39 about the geometric mean position of an image point for an axial point object is at the optical axis 12 on the screen 39.

A point object off the axis 12 sends rays, represented by the exemplary rays 15 and 16, through objective lens 10 and the collimating lens 11 each of which converge the rays. The line 13 representing the principal ray from this object, as shown by a portion of the line at 17, is parallel to the optical axis 12 after having passed through the collimating lens 11. The tilted plates 18 and 26 refract the rays of this light beam, and the rays are brought to focus at a point 51 on the screen 39. The point of focus on the screen 39 for the image of the non-axial object is on the substantially circular locus path 50, shown in Fig. 3.

In the positions shown in Fig. 1, the plate 18 refracts rays downward, and the plate 26 refracts rays upward from the plane of Fig. 1. These displacements are downward and to the right in the plane of Fig. 3. The rotation of the barrel 41, the plate 18 and the plate 26 about the optical axis 12 causes the point image of the non-axial point object considered above to follow the substantially circular locus path 50 on the screen 39. The locus path 50 is substantially concentric about the geometric mean position at 52 at which the image point for the particular non-axial object point would be formed if the plates 18 and 26 were not tilted with respect to the optical axis, but instead were merely perpendicular thereto.

Axial and non-axial object points each form series of image points which describe the substantially circular locus paths about geometric means positions of each respective locus.

Image aberrations introduced by apparatus of this invention are negligible, because aberrations caused by plate 18 are compensated by plate 26.

The moving parts of this device are of light weight construction, and require only a simple rotary actuation, both of which features are desirable for ease in maintenance, proper adjustment, and operation of the apparatus.

The optical system works well for all image positions in the focal plane, both for axial and non-axial objects. In addition, the objective lens, that is, the exit pupil, is imaged at infinity by the collimating lens when viewed from behind the focal plane, since the collimating lens is designed to produce this result. The result is that a condensing lens can be used to image the entrance aperture of the system on a detector without motion of this image because of rotation of the two inclined refracting plates.

The result of the rotation of the two tilted rotating plates is that each point imaged on the screen is caused to describe an approximately circular path about its geometric mean position, which enables an operator viewing the image plane to accurately determine its geometric mean position by reference to the circular path. In gunsight applications, for example, a gun is more easily and accurately aimed by reference to the center of a circle than by reference to a single point image. A device using this apparatus is on target when the circular image locus is concentric about the optical axis of the apparatus.

Also, in optical detecting devices, a single point image may escape an operator's notice if it were an image of relatively low intensity compared to the field. However, a circle of an intensity wherein a point might be overlooked, is ordinarily noticeable. A further advantage of forming a circular image path is that it avoids congestion at the center of the field, by extending the image to the shape of a circle.

In automatic detecting or tracking devices the circular locus of images of object points permits more accurate information to be obtained particularly as to axial objects.

These and other advantages and uses of this invention will be appreciated, wherein a distinct circular reference path can permit the accurate determination of the geometric mean position of the path quickly and easily.

This invention is to be limited only in accordance with the scope of the appended claims, since others skilled in the art may devise other embodiments still within the limitations of the claims.

I claim:

1. An optical system having an optical axis, an objective lens and a collimating lens disposed on said optical axis, said collimating lens serving to collimate principal rays passing through the optical center of said objective lens at said axis so that principal rays are made parallel to said optical axis, a first transparent plate disposed on said optical axis and having parallel plane major surfaces, each of which is inclined at an angle relative to said optical axis, a second transparent plate disposed on said optical axis and having parallel plane major surfaces, each of which is also inclined at an angle to said optical axis, said angles being equal to each other, said major surfaces of the first plate making an angle with a reference plane and said major surfaces of the second plate making an angle with a second reference plane, said angles formed by said major surfaces of the first and second plates with the first and second reference planes, respectively, being equal to the other, said first and second reference planes being parallel to each other and perpendicular to the optical axis, said transparent plates each being disposed along the optical axis and being positioned normal to a respective plane which contains the optical axis, the said respective planes being at an angle to each other, and a means for rotating both of said transparent plates in unison about said optical axis.

2. Apparatus in accordance with claim 1 wherein the angle between said respective planes is 90°.

3. Apparatus in accordance with claim 1 wherein said first and second transparent plates have the same thickness.

4. Apparatus in accordance with claim 1 wherein said first and second transparent plates are of the same material.

5. An optical system having an optical axis, an objective lens and a second lens disposed on said optical axis, a first transparent plate disposed on said optical axis and having parallel plane major surfaces, each of which is inclined at an angle relative to said optical axis, a second transparent plate disposed on said optical axis and having parallel plane major surfaces, each of which is also inclined at an angle to said optical axis, said angles being equal to each other, said major surfaces of the first plate making an angle with a reference plane and said major surfaces of the second plate making an angle with a second reference plane, said angles formed by said major surfaces of the first and second plates with the first and second reference planes respectively being equal to each other, said first and second reference planes being parallel to each other and perpendicular to the optical axis, said transparent plates each being disposed along the optical axis and being positioned normal to a respective plane which contains the optical axis, the said respective planes being perpendicular to each other, and a means for display of images formed by said optical system.

6. A system according to claim 5 in which said second lens is a collimating lens which collimates principal rays passing through the optical center of the objective lens.

7. Apparatus in accordance with claim 5 wherein said means for display of images formed by said optical system is a screen.

8. Apparatus according to claim 1 in which said means for rotating said two plates comprises a frame, a barrel, said frame holding said two plates within said barrel, a plurality of rollers, roller tracks on said barrel for said rollers to travel upon, and a motive means for rotating said barrel about said optical axis.

9. Apparatus according to claim 8 in which said motive means for rotating said barrel about said optical axis comprises a motor, a shaft, a gear, and gear teeth provided on said barrel which are in mechanical contact with said gear.

References Cited in the file of this patent

UNITED STATES PATENTS

| | | |
|---|---|---|
| 1,283,676 | Comstock | Nov. 5, 1918 |
| 2,017,634 | Newcomer | Oct. 15, 1935 |
| 2,810,323 | Coleman | Oct. 22, 1957 |
| 2,816,480 | Tushinsky | Dec. 17, 1957 |